(12) United States Patent
Savard et al.

(10) Patent No.: US 12,467,386 B2
(45) Date of Patent: Nov. 11, 2025

(54) MECHANICAL DISSUASION DEVICE FOR A FLUID ASSEMBLY JOINT

(71) Applicant: Pratt & Whitney Canada Corp., Longueuil (CA)

(72) Inventors: Philippe Savard, Terrebonne (CA); Guy Lefebvre, St-Bruno (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 140 days.

(21) Appl. No.: 18/117,949

(22) Filed: Mar. 6, 2023

(65) Prior Publication Data

US 2024/0301804 A1 Sep. 12, 2024

(51) Int. Cl.
*F16L 19/00* (2006.01)
*F01D 25/18* (2006.01)
*F16L 55/10* (2006.01)

(52) U.S. Cl.
CPC ............ *F01D 25/18* (2013.01); *F16L 19/005* (2013.01); *F16L 55/10* (2013.01); *F05D 2260/36* (2013.01)

(58) Field of Classification Search
CPC .................................................. F16L 19/005
See application file for complete search history.

(56) References Cited

U.S. PATENT DOCUMENTS

| 565,874 | A | * | 8/1896 | Bernstein | F16B 41/007 |
| | | | | | 292/307 B |
| 1,365,477 | A | * | 1/1921 | Gabriel | G01F 15/185 |
| | | | | | 411/87 |
| 3,678,717 | A | * | 7/1972 | Eaton | F16L 35/00 |
| | | | | | 285/80 |
| 5,048,875 | A | | 9/1991 | Usui | |

(Continued)

FOREIGN PATENT DOCUMENTS

| CN | 209909348 U | 1/2020 |
| EP | 0786617 A2 | 7/1997 |

(Continued)

OTHER PUBLICATIONS

EP Search Report for EP Patent Application No. 24161838.8 dated Dec. 13, 2024.

*Primary Examiner* — Zachary T Dragicevich
*Assistant Examiner* — Alexander T Rufrano
(74) *Attorney, Agent, or Firm* — Getz Balich LLC (57) ABSTRACT

A mechanical dissuasion device includes a sleeve body forming a cylindrical body portion, a first tab, a second tab, and opposing fastener mounts. The cylindrical body portion extends circumferentially about a center axis between and to a first circumferential end and a second circumferential end. The cylindrical body portion extends axially between and to a first axial end and a second axial end. The first tab is disposed at the first axial end and extends radially inward from the cylindrical body portion. The second tab is axially spaced from the first axial end and the second axial end and (Continued)

extends radially inward from the cylindrical body portion. The opposing fastener mount portions include a first fastener mount portion and a second fastener mount portion. The first fastener mount portion is disposed at the first circumferential end. The second fastener mount portion is disposed at the second circumferential end.

5 Claims, 7 Drawing Sheets

(56) References Cited

U.S. PATENT DOCUMENTS

| | | | | |
|---|---|---|---|---|
| 5,350,201 | A * | 9/1994 | Bynum | F16B 39/02 |
| | | | | 285/330 |
| 5,490,693 | A * | 2/1996 | Fisher | F16L 19/005 |
| | | | | 285/420 |
| 6,135,509 | A | 10/2000 | Billington, III | |
| 6,322,306 | B1 * | 11/2001 | Dutton | F16L 19/005 |
| | | | | 411/234 |
| 7,980,598 | B2 | 7/2011 | Tsubota | |
| 9,383,047 | B2 * | 7/2016 | Alexander | F16L 19/005 |
| 9,845,904 | B2 | 12/2017 | Kim | |
| 10,012,258 | B2 | 7/2018 | Lambert | |
| 10,697,370 | B2 | 6/2020 | Mckenney | |
| 11,415,015 | B2 | 8/2022 | Fryer | |
| 2019/0112946 | A1 | 4/2019 | Matteson | |
| 2021/0071786 | A1 | 3/2021 | Kogure | |

FOREIGN PATENT DOCUMENTS

| | | | | |
|---|---|---|---|---|
| KR | 2015047461 | A * | 5/2015 | F16B 39/02 |
| KR | 101644596 | B1 * | 8/2016 | |

* cited by examiner

MECHANICAL DISSUASION DEVICE FOR A FLUID ASSEMBLY JOINT

TECHNICAL FIELD

This disclosure relates generally to fluid assembly fitting connections and, more particularly, to mechanical devices for obstructing operation of fluid assembly fitting connections.

BACKGROUND OF THE ART

A fluid assembly, such as a fluid assembly used in a propulsion system lubrication assembly or other propulsion system fluid assembly, may include numerous joints or other fitting connections coupling components of the fluid assembly together. Some joints or other fitting connections for a fluid assembly may have particular operating and/or installation practices or other considerations. Various systems and methods are known in the art for facilitating operation of fluid assembly components such as those forming fluid joints or other fitting connections. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a mechanical dissuasion device includes a sleeve body forming a cylindrical body portion, a first tab, a second tab, and opposing fastener mounts. The cylindrical body portion extends circumferentially about a center axis of the sleeve body. The cylindrical body portion extends circumferentially between and to a first circumferential end and a second circumferential end. The first circumferential end is circumferentially spaced from the second circumferential end. The cylindrical body portion extends axially between and to a first axial end and a second axial end. The first tab is disposed at the first axial end. The first tab extends radially inward from the cylindrical body portion. The second tab is axially spaced from the first axial end and the second axial end. The second tab extends radially inward from the cylindrical body portion. The opposing fastener mount portions include a first fastener mount portion and a second fastener mount portion. The first fastener mount portion is disposed at the first circumferential end and extends radially outward from the cylindrical body portion. The first fastener mount portion forms a first fastener aperture. The second fastener mount portion is disposed at the second circumferential end and extends radially outward from the cylindrical body portion. The second fastener mount portion forms a second fastener aperture. The first fastener aperture and the second fastener aperture are configured to receive a fastener.

In any of the aspects or embodiments described above and herein, the opposing fastener mount portions may be disposed axially between the first tab and the second tab.

In any of the aspects or embodiments described above and herein, the mechanical dissuasion device may further include the fastener extending through the first fastener aperture and the second fastener aperture. The fastener may be configured to control a size of a circumferential gap between the first circumferential end and the second circumferential end.

In any of the aspects or embodiments described above and herein, the mechanical dissuasion device may further include a locking device fixedly attached to the fastener. The locking device may be configured to maintain the fastener in a fixed position.

According to another aspect of the present disclosure, an assembly for an aircraft propulsion system includes a first fluid conduit, a second fluid conduit, and a mechanical dissuasion device. The first fluid conduit includes a first conduit body and a first threaded fitting. The first conduit body includes a first end. The first threaded fitting is disposed at the first end. The first threaded fitting extends between and to a first axial fitting end and a second axial fitting end. The second fluid conduit includes a second conduit body and a second threaded fitting. The second conduit body includes a second end. The second threaded fitting is disposed at the second end. The second threaded fitting is threadably engaged with the first threaded fitting. The mechanical dissuasion device includes a sleeve body forming a cylindrical body portion, a first tab, and a second tab. The cylindrical body portion extends circumferentially about the first threaded fitting, the second threaded fitting, and a center axis of the sleeve body. The cylindrical body portion extends circumferentially between and to a first circumferential end and a second circumferential end. The first circumferential end is circumferentially spaced from the second circumferential end. The cylindrical body portion extends axially between and to a first axial end and a second axial end. The first tab extends from the cylindrical body portion at the first axial end. The first tab disposed at the first axial fitting end. The second tab extends from the cylindrical body portion at a position axially spaced from the first axial end and the second axial end. The second tab is disposed at the second axial fitting end.

In any of the aspects or embodiments described above and herein, the first threaded fitting may be rotatably mounted to the first conduit body.

In any of the aspects or embodiments described above and herein, the first threaded fitting may include a first exterior mechanical operating surface and the cylindrical body portion may be disposed circumferentially and axially coincident with the first exterior mechanical operating surface.

In any of the aspects or embodiments described above and herein, the second threaded fitting may include a second exterior mechanical operating surface and the cylindrical body portion may be disposed circumferentially and axially coincident with the second exterior mechanical operating surface.

In any of the aspects or embodiments described above and herein, the first exterior mechanical operating surface may form a portion of a hexagonal pattern.

In any of the aspects or embodiments described above and herein, the cylindrical body portion may form a slot between the first circumferential end and the second circumferential end. The slot may extend from the first axial end to the second axial end.

In any of the aspects or embodiments described above and herein, the sleeve body may further form opposing fastener mount portions including a first fastener mount portion and a second fastener mount portion. The first fastener mount portion may be disposed at the first circumferential end and may extend radially outward from the cylindrical body portion. The first fastener mount portion may form a first fastener aperture. The second fastener mount portion may be disposed at the second circumferential end and may extend radially outward from the cylindrical body portion. The second fastener mount portion may form a second fastener aperture.

In any of the aspects or embodiments described above and herein, the mechanical dissuasion device may further include a fastener extending through the first fastener aperture and the second fastener aperture. The fastener may be configured to control a size of the slot.

In any of the aspects or embodiments described above and herein, the mechanical dissuasion device may further include a locking device fixedly attached to the fastener. The locking device may be configured to maintain the fastener in a fixed position.

In any of the aspects or embodiments described above and herein, the locking device may include a locking wire extending between and to a first wire end and a second wire end. The locking wire may be fixedly attached to the second threaded fitting at the first wire end and the locking wire may be fixedly attached to the fastener at the first wire end.

According to another aspect of the present disclosure, a lubricant assembly for an aircraft propulsion system includes a bearing system, a lubricant source, a first lubricant conduit and a second lubricant conduit forming a lubricant flow path from the lubricant source to the bearing system, and a mechanical dissuasion device. The first lubricant conduit includes a first conduit body and a first threaded fitting. The first conduit body includes a first end. The first threaded fitting is disposed at the first end. The first threaded fitting extends between and to a first axial fitting end and a second axial fitting end. The second lubricant conduit includes a second conduit body and a second threaded fitting. The second conduit body includes a second end. The second threaded fitting is disposed at the second end. The second threaded fitting is threadably engaged with the first threaded fitting. The mechanical dissuasion device includes a sleeve body forming a body portion, a first tab, and a second tab. The body portion extends circumferentially about the first threaded fitting, the second threaded fitting, and a center axis of the sleeve body. The first tab is disposed at the first axial fitting end and radially coincident with the first threaded fitting. The second tab is disposed at the second axial fitting end and radially coincident with the first threaded fitting.

In any of the aspects or embodiments described above and herein, the first threaded fitting may be rotatably mounted to the first conduit body.

In any of the aspects or embodiments described above and herein, the first threaded fitting may include a first exterior mechanical operating surface and the cylindrical body portion may be disposed circumferentially and axially coincident with the first exterior mechanical operating surface.

In any of the aspects or embodiments described above and herein, the second threaded fitting may include a second exterior mechanical operating surface and the cylindrical body portion may be disposed circumferentially and axially coincident with the second exterior mechanical operating surface.

In any of the aspects or embodiments described above and herein, the body portion may extend circumferentially between and to a first circumferential end and a second circumferential end. The body portion may form a slot between the first circumferential end and the second circumferential end.

The present disclosure, and all its aspects, embodiments and advantages associated therewith will become more readily apparent in view of the detailed description provided below, including the accompanying drawings.

DETAILED DESCRIPTION

Figure 1:
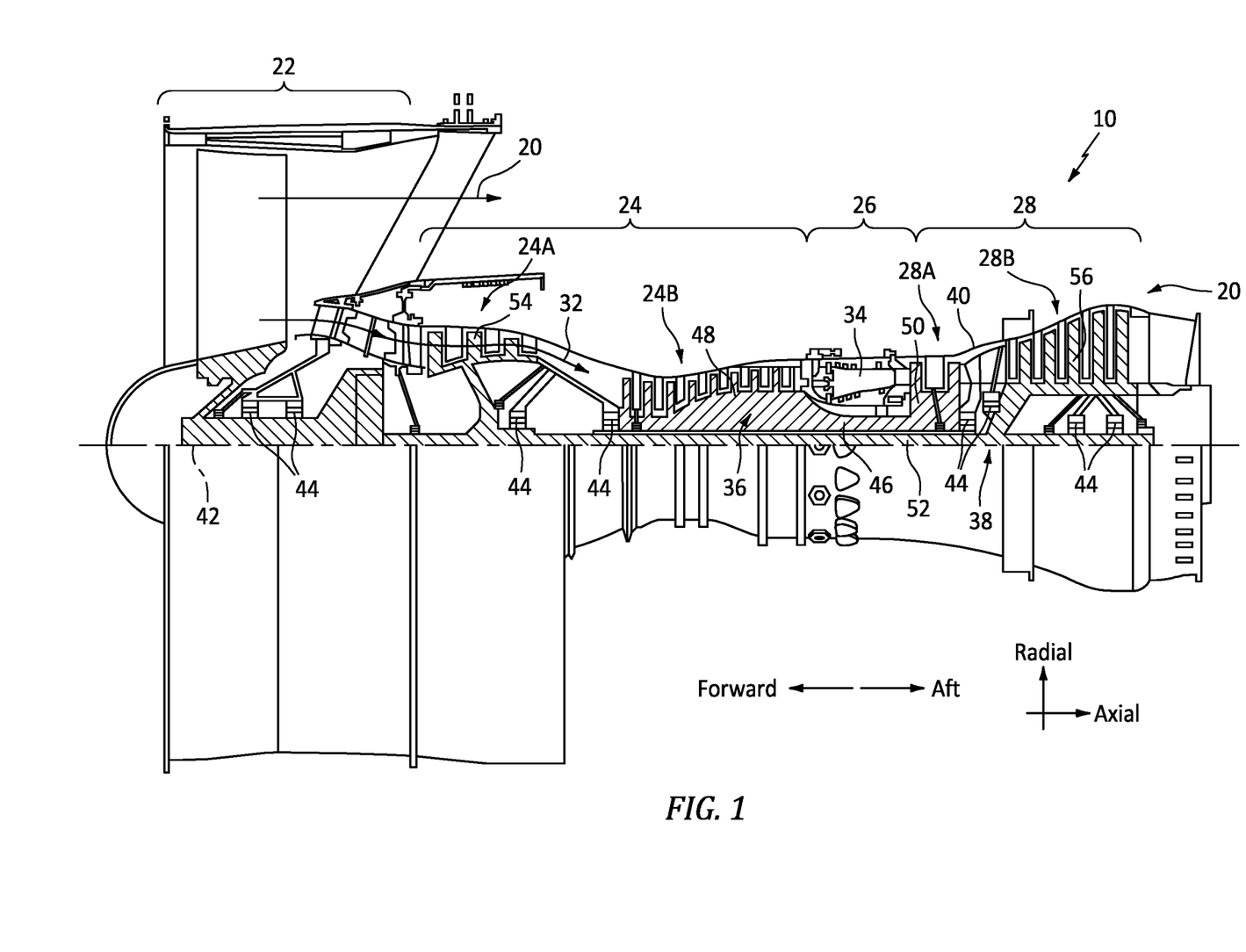
FIG. 1 illustrates a schematic cutaway of a gas turbine engine for an aircraft propulsion system, in accordance with one or more embodiments of the present disclosure.

FIG. 1 schematically illustrates a propulsion system 10 for an aircraft. The propulsion system 10 includes a gas turbine engine 20. The gas turbine engine 20 of FIG. 1 is a multi-spool turbofan gas turbine engine. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Aspects of the present disclosure may also be equally applicable to other types of aircraft propulsion systems which do not include gas turbine engines such as, but not limited to, an electric-fan propulsion system, an electric-prop propulsion system, or the like.

The gas turbine engine 20 of FIG. 1 includes a fan section 22, a compressor section 24, a combustor section 26, and a turbine section 28. The fan section 22 drives air along a bypass flow path 30 while the compressor section 24 drives air along a core flow path 32 for compression and communication into the combustor section 26 and then expansion through the turbine section 28. The compressor section 24 of FIG. 1 includes a low-pressure compressor 24A and a high-pressure compressor 24B downstream of the low-pressure compressor 24A. The turbine section 28 of FIG. 1 includes a high-pressure turbine (HPT) 28A and a low-pressure turbine (LPT) 28B downstream of the high-pressure turbine 28A. The combustor section 26 of FIG. 1 includes an annular combustor 34 disposed between the high-pressure compressor 24B and the high-pressure turbine 28A along the core flow path 32.

The gas turbine engine 10 of FIG. 1 includes a first rotational assembly 36 (e.g., a high-pressure spool), a second rotational assembly 38 (e.g., a low-pressure spool), and an engine static structure 40 (e.g., an engine case, a bearing compartment case, etc.). The first rotational assembly 36 and the second rotational assembly 38 are mounted for rotation about an axial centerline 42 (e.g., a rotational axis) of the gas turbine engine 20 relative to the engine static structure 40. The first rotational assembly 36 and the second rotational assembly 38 may be rotatably supported by one or more bearing systems 44. It should be understood that bearing systems, such as the bearing systems 44 of FIG. 1, may be provided at various additional or alternative locations of the gas turbine engine 20. The present disclosure, however, is not limited to two-spool gas turbine engine configurations and, for example, is also applicable to single spool, three-spool, and other gas turbine engine configurations.

The first rotational assembly 36 of FIG. 1 includes a first shaft 46, a bladed first compressor rotor 48 for the high-pressure compressor 24B, and a bladed first turbine rotor 50 for the high-pressure turbine 28A. The first shaft 46 interconnects the bladed first compressor rotor 48 and the bladed first turbine rotor 50. The second rotational assembly 38 of FIG. 1 includes a second shaft 52, a bladed second compressor rotor 54 for the low-pressure compressor 24A, and a bladed second turbine rotor 56 for the low-pressure turbine 28B. The second shaft 52 interconnects the bladed second compressor rotor 54 and the bladed second turbine rotor 56. In operation, airflow along the core flow path 32 is compressed by the bladed second compressor rotor 54 and the bladed first compressor rotor 48, mixed and burned with fuel in the combustor 34, and then expanded across the bladed first turbine rotor 50 and the bladed second turbine rotor 56. The bladed first turbine rotor 50 and the bladed second turbine rotor 56 rotationally drive the first rotational assembly 36 and the second rotational assembly 38, respectively, in response to the expansion of the combustion gases. The first shaft 46 and the second shaft 52 are concentric and rotate via the one or more bearing systems 44 about the axial centerline 42, which axial centerline 42 is collinear with respective rotational axes of the first shaft 46 and the second shaft 52. The present disclosure, however, is not limited to concentric configurations of the first shaft 46 and the second shaft 52.

Figure 2:
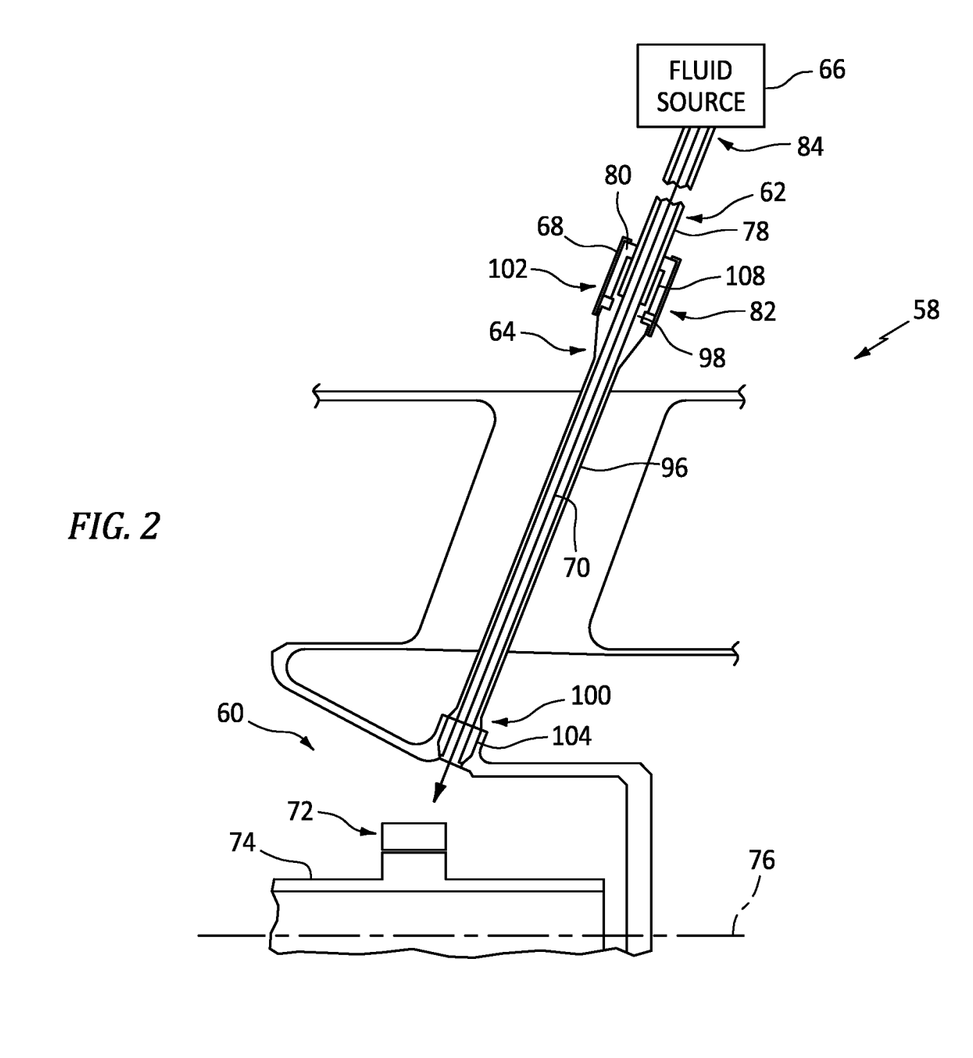
FIG. 2 illustrates a side, cutaway view of a fluid assembly, in accordance with one or more embodiments of the present disclosure.

FIG. 2 illustrates a cutaway view of a fluid assembly 58 (e.g., a lubrication assembly for the gas turbine engine 20). For example, the fluid assembly 58 of FIG. 2 includes a bearing system 60, a first fluid conduit 62, a second fluid conduit 64, a fluid source 66, and a mechanical dissuasion device 68. The first fluid conduit 62 and the second fluid conduit 64 are configured to cooperatively form a fluid flow path 70 to direct a fluid (e.g., a lubricant) from the fluid source 66 to the bearing system 60.

The bearing system 60 includes at least one bearing 72 configured to rotatably support rotational equipment 74 having an axial centerline 76 (e.g., a rotational axis). An example of such rotational equipment includes, but is not limited to, the first rotational assembly 36 and the second rotational assembly 38. For example, the bearing system 60 may form one of the bearing systems 44 of the gas turbine engine 20 of FIG. 1.

Figure 3:
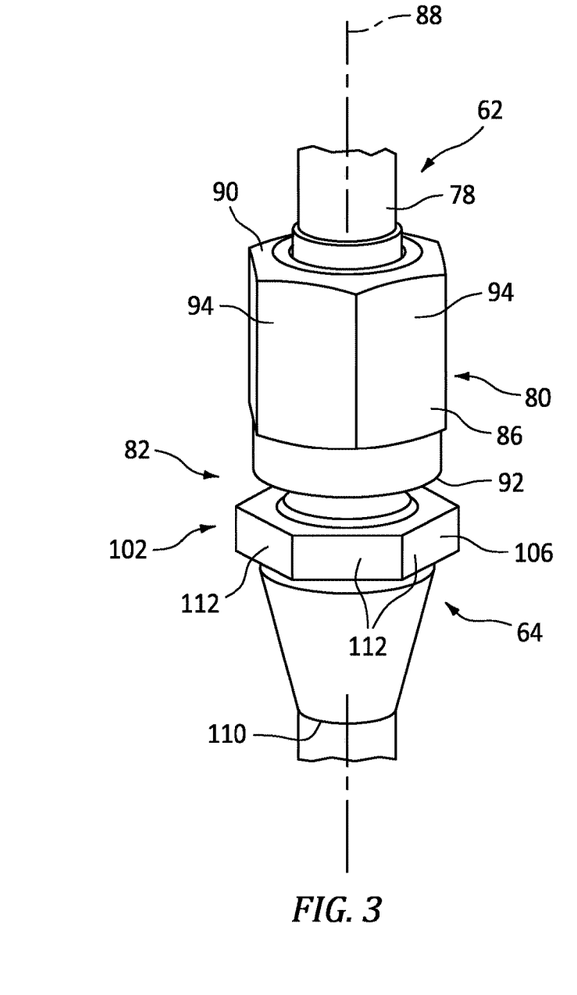
FIG. 3 illustrates a perspective view of a portion of the fluid assembly of FIG. 2, in accordance with one or more embodiments of the present disclosure.

Referring to FIGS. 2 and 3, the first fluid conduit 62 includes a first conduit body 78 and a first fitting 80. The first conduit body 78 forms a rigid or flexible fluid conduit suitable for directing a fluid therethrough along the fluid flow path 70 (e.g., a hose, a tube, a pipe, etc.). The first conduit body 78 is directly or indirectly connected in fluid communication with the fluid source 66 to receive a fluid from the fluid source 66. For example, the first conduit body 78 of FIG. 2 is directly connected in fluid communication with the fluid source 66, however, the fluid assembly 58 may alternatively include one or more intermediate components (e.g., conduits, valves, filters, pumps, sensors, etc.) connected in fluid communication with and between the first conduit body 78 and the fluid source 66. The first conduit body 78 includes a first end 82 and a second end 84 opposite the first end 82. In FIG. 2, the first end 82 may be understood as a downstream end of the first conduit body 78 and the second end 84 may be understood as an upstream end of the first conduit body 78, with respect to the fluid flow path 70.

FIG. 3 illustrates a portion of the first fluid conduit 62 and the second fluid conduit 64 with the mechanical dissuasion device 68 omitted for clarity. The first fitting 80 is disposed on the first conduit body 78 at (e.g., on, adjacent, or proximate) the first end 82. The first fitting 80 is configured to selectively connect the first fluid conduit 62 in fluid communication with another component of the fluid assembly 58 such as, for example, the second fluid conduit 64. The first fitting 80 may be a threaded fitting. For example, the first fitting 80 may include internal threading configured to allow threaded engagement with another component of the fluid assembly 58 to selectively connect the first fitting 80 in fluid communication with the other component of the fluid assembly 58. The first fitting 80, however, may alternatively include other selective connection configurations such as, but not limited to, quick-disconnect couplings. The first fitting 80 of FIG. 3 is rotatably mounted to the first conduit body 78 at the first end 82 to allow the first fitting 80 to rotate relative to the first conduit body 78, thereby facilitating threaded engagement of the first fitting 80 with another threaded component of the fluid assembly 58. The first fitting 80 may include a first portion which is fixed (e.g., rotationally fixed) to the first conduit body 78 and a second portion which is rotatable relative to the first portion. The first fitting 80 (e.g., the entire first fitting 80) may alternatively be rotationally fixed relative to the first conduit body 78.

The first fitting 80 includes a first fitting body 86. The first fitting body 86 of FIG. 3 extends circumferentially about (e.g., completely around) at least a portion of the first conduit body 78. As shown in FIG. 3, the first fitting body 86 extends circumferentially about (e.g., completely around) an axis 88 (e.g., a center axis), which axis 88 may also be common to one or more other components of the fluid assembly 58 (e.g., in an assembled condition). The first fitting body 86 extends between and to a first axial end 90 of the first fitting 80 and a second axial end 92 of the first fitting 80. The second axial end 92 may form a terminal end of the first fluid conduit 62. The first fitting body 86 further includes one or more exterior surfaces 94 disposed between the first axial end 90 and the second axial end 92. The exterior surfaces 94 may be configured as mechanical operating surfaces to engage with a mechanical device (e.g., a wrench or other tool) such that the mechanical device can be used to operate (e.g., connect, disconnect, tighten, loosen, etc.) the first fitting 80 relative to another component such as, but not limited to, the second fitting 98. For example, the exterior surfaces 94 of FIG. 3 form a hexagonal pattern which may facilitate operation of the first fitting 80 by a conventional wrench. The present disclosure, however, is not limited to any particular exterior surface 94 pattern for the first fitting body 86.

The second fluid conduit 64 includes a second conduit body 96 and a second fitting 98. The second conduit body 96 forms a rigid or flexible fluid conduit suitable for directing a fluid therethrough along the fluid flow path 70 (e.g., a hose, a tube, a pipe, etc.). The second conduit body 96 includes a first end 100 and a second end 102 opposite the first end 100. In FIG. 2, the first end 100 may be understood as a downstream end of the second conduit body 96 and the second end 102 may be understood as an upstream end of the second conduit body 96, with respect to the fluid flow path 70. The first end 100 of the second conduit body 96 of FIG. 2 is connected in fluid communication with one or more nozzles 104 to direct a fluid (e.g., lubricant) to one or more components of the bearing system 60 such as, but not limited to, the bearings 72.

The second fitting 98 is disposed on the second conduit body 96 at (e.g., on, adjacent, or proximate) the second end 102. The second fitting 98 is configured to selectively connect the second fluid conduit 64 in fluid communication with another component of the fluid assembly 58 such as, for example, the first fluid conduit 62. The second fitting 98 may be a threaded fitting. For example, the second fitting 98 may include threading configured to allow threaded engagement with another component of the fluid assembly 58 to selectively connect the second fitting 98 in fluid communication with the other component of the fluid assembly 58. The second fitting 98, however, may alternatively include other selective connection configurations such as, but not limited to, quick-disconnect couplings. The second fitting 98 of FIG. 3 is rotatably fixed to the second conduit body 96 at the second end 102. The second fitting 98 may alternatively be rotatably mounted to the second conduit body 96 at the second end 102 to allow the second fitting 98 to rotate relative to the second conduit body 96.

The second fitting 98 includes a second fitting body 106. As shown in FIG. 3, the second fitting body 106 extends circumferentially about (e.g., completely around) the axis 88. The second fitting body 106 extends between and to a first axial end 108 (not shown in FIG. 3; see FIG. 2) of the second fitting 98 and a second axial end 110 of the second fitting 98. The first axial end 108 may form a terminal end of the second fluid conduit 64. The second fitting body 106 further includes one or more exterior surfaces 112 disposed between the first axial end 108 and the second axial end 110. The exterior surfaces 112 may be configured as mechanical operating surfaces to engage with a mechanical device (e.g., a wrench or other tool) such that the mechanical device can be used to operate (e.g., connect, disconnect, tighten, loosen, etc.) relative to another component such as, but not limited to, the first fitting 80. For example, the exterior surfaces 112 of FIG. 3 form a hexagonal pattern which may facilitate operation of the second fitting 98 by a conventional wrench. The present disclosure, however, is not limited to any particular exterior surface 112 pattern for the second fitting body 106.

The first fitting 80 and the second fitting 98 of FIGS. 2 and 3 are connected together (e.g., threadably connected) in fluid communication at a joint to form the fluid flow path 70 from the fluid source 66 to the one or more nozzles 104. The first fitting 80 and the second fitting 98 form a fluid seal therebetween. For example, as shown in FIG. 2, contact between the first fitting body 86 and the second fitting body 106 (e.g., sealing surfaces of the first fitting body 86 and the second fitting body 106) may form a fluid seal (e.g., a hard seal, a cone-to-cone seal, etc.). Alternatively, one or both of the first fitting 80 and the second fitting 98 may include a discrete sealing component (e.g., an O-ring) disposed between the first fitting body 86 and the second fitting body 106 and configured to form a fluid seal between the first fitting 80 and the second fitting 98.

During the operational life of a fluid assembly, such as a fluid assembly for an aircraft propulsion system (e.g., the fluid assembly 58), the fluid assembly may undergo periodic maintenance. We have observed that, in some cases, maintenance technicians have performed mechanical operations on fluid assembly joints (e.g., the joint between the first fitting 80 and the second fitting 98) and that these mechanical operations have the potential to detrimentally impact the operation of the associated fluid assembly. As an example, threaded connections between fluid assembly components (e.g., the first fitting 80 and the second fitting 98) may be over-torqued or under-torqued relative to design specifications for these threaded connections. As a result of over-torquing, for example, fluid assembly components may experience damage (e.g., damaged to seals or sealing surfaces) and an increased likelihood of fluid leakage and/or early fluid assembly component replacement. As a result of under-torquing, for example, fluid assembly components may exhibit some or increased fluid leakage at fluid assembly component connections. As another example, fluid assembly components (e.g., the first fitting 80 and the second fitting 98) may be disconnected and improperly reconnected, thereby presenting an increased risk of fluid assembly component damage and/or fluid leakage.

Figure 4:
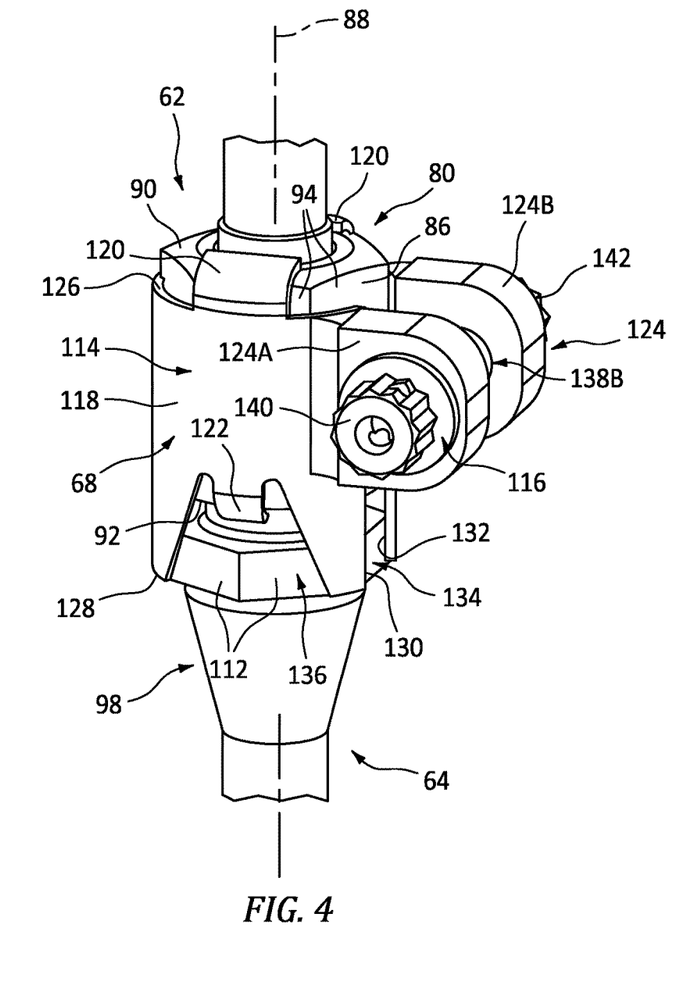
FIG. 4 illustrates another perspective view of a portion of the fluid assembly of FIG. 2 with a mechanical dissuasion device installed, in accordance with one or more embodiments of the present disclosure.
Figure 5:
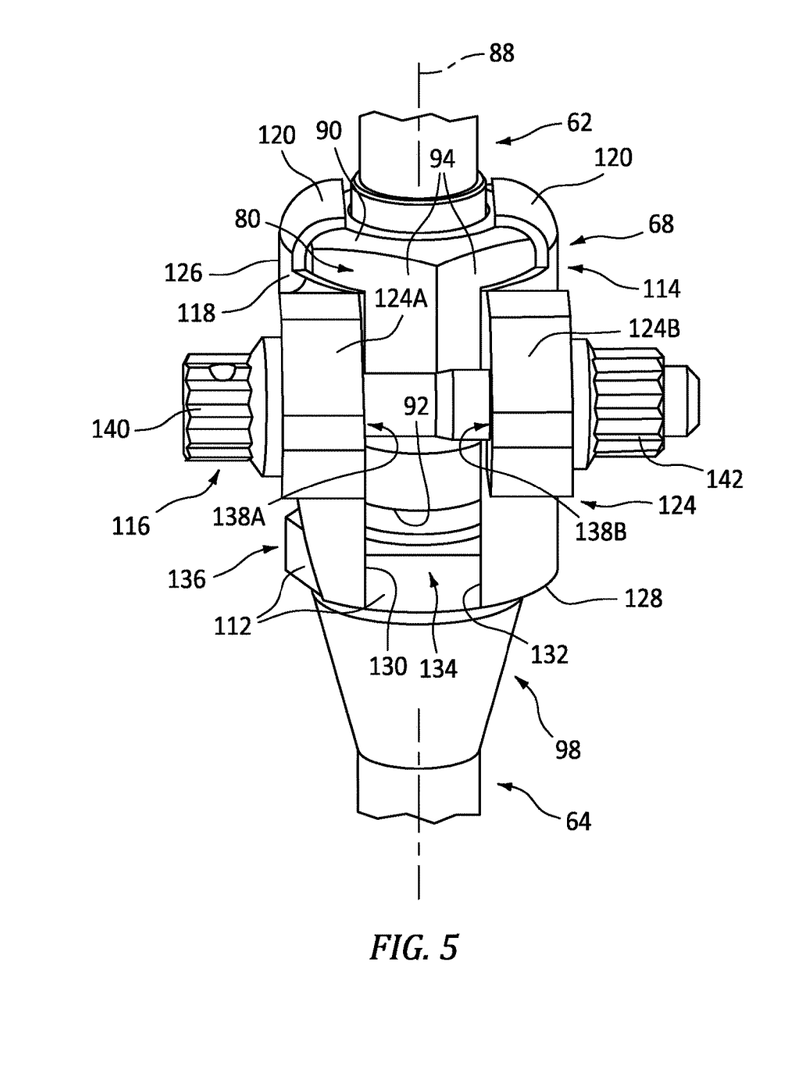
FIG. 5 illustrates another perspective view of a portion of the fluid assembly of FIG. 2 with the mechanical dissuasion device installed, in accordance with one or more embodiments of the present disclosure.
Figure 6:
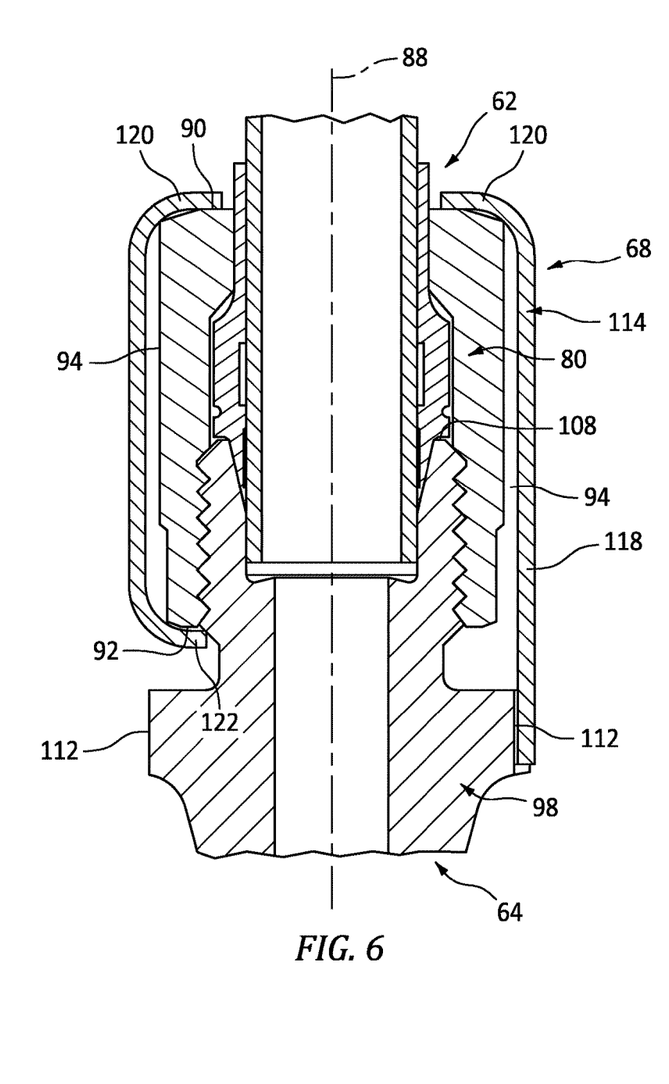
FIG. 6 illustrates a side, cutaway view of a portion of the fluid assembly of FIG. 2 with the mechanical dissuasion device installed, in accordance with one or more embodiments of the present disclosure.

Referring to FIGS. 4-6, the mechanical dissuasion device 68 may be installed at a joint between fluid assembly components to prevent or obstruct mechanical operation of the fluid assembly components forming the joint. For example, the mechanical dissuasion device 68 of FIGS. 4-6 is installed at (e.g., on, adjacent, or proximate) the first fitting 80 and the second fitting 98 to prevent or obstruct mechanical operation of the first fitting 80 and the second fitting 98. While the mechanical dissuasion device 68 of the present disclosure is described herein with respect to the first fluid conduit 62, the second fluid conduit 64, and their respective fittings 80, 98, it should be understood that aspects of the present disclosure mechanical dissuasion device 68 are relevant to preventing or obstructing mechanical operation at fluid connections between other fluid assembly components as well.

The mechanical dissuasion device 68 of FIGS. 4-6 includes a sleeve body 114 and at least one fastener 116. The sleeve body 114 of the mechanical dissuasion device 68 extends along the axis 88. The sleeve body 114 includes a cylindrical body portion 118, at least one first tab 120, and at least one second tab 122. The sleeve body 114 may additionally include one or more fastener mount portions 124.

The cylindrical body portion 118 extends (e.g., axially extends) between and to a first axial end 126 of the cylindrical body portion 118 and a second axial end 128 of the cylindrical body portion 118. The first axial end 126 of FIGS. 4-6 is disposed at (e.g., on, adjacent, or proximate) the first fitting 80. The second axial end 128 of FIGS. 4-6 is disposed at (e.g., on, adjacent, or proximate) the second fitting 98. The cylindrical body portion 118 extends circumferentially about the axis 88. For example, the cylindrical body portion 118 extends circumferentially about the axis 88 between and to a first circumferential end 130 of the cylindrical body portion 118 and a second circumferential end 132 of the cylindrical body portion 118. The first circumferential end 130 is spaced (e.g., circumferentially spaced) from the second circumferential end 132 such that the cylindrical body portion 118 forms a slot 134 (e.g., a circumferential gap) between the first circumferential end 130 and the second circumferential end 132. The slot 134 extends axially through the cylindrical body portion 118 from the first axial end 126 to the second axial end 128. The cylindrical body portion 118 also extends circumferentially about the first fitting 80 and the second fitting 98. For example, the cylindrical body portion 118 of FIGS. 4-6 circumferentially surrounds at least a substantial circumferential portion of the first fitting body 86 (e.g., the exterior surfaces 94) and the second fitting body 106 (e.g., the exterior surfaces 112). The cylindrical body portion 118 of FIGS. 4-6 is disposed at (e.g., on, adjacent, or proximate) the exterior surfaces 94 and the exterior surfaces 112. For example, the cylindrical body portion 118 may be disposed axially and circumferentially contiguous with all or a substantial portion of at least one of the exterior surfaces 94. The cylindrical body portion 118 may also be disposed axially and circumferentially contiguous with all or a substantial portion of at least one of the exterior surfaces 112. Accordingly, the cylindrical body portion 118 obstructs mechanical device (e.g., a wrench or other tool) access to the exterior surfaces 94 and the exterior surfaces 112. As best illustrated in FIG. 4, the cylindrical body portion 118 may form at least one notch 136 extending through the cylindrical body portion 118 from the second axial end 128. The notch 136 may extend from the second axial end 128 to a position axially between and spaced from the first axial end 126 and the second axial end 128.

The at least one first tab 120 is disposed at (e.g., on, adjacent, or proximate) the first axial end 126. The sleeve body 114 of FIGS. 4-6 includes two first tabs 120 disposed on opposing circumferential portions of the sleeve body 114, however, the present disclosure is not limited to any particular number of the at least one first tab 120. The first tab 120 extends radially inward from the cylindrical body portion 118 at the first axial end 126. The first tab 120 of FIGS. 4-6 is disposed at (e.g., on, adjacent, or proximate) the first axial end 90 and radially overlaps the first fitting body 86. Accordingly, the first tab 120 may prevent or otherwise limit relative axial movement between the mechanical dissuasion device 68 and the first fitting 80 and the second fitting 98. For example, the first tab 120 of FIGS. 4-6 may prevent or otherwise limit axial movement of the mechanical dissuasion device 68 in an axial direction from the first fitting 80 toward the second fitting 98 (e.g., as a result of physical contact between the first tab 120 and the first fitting body 86 at the first axial end 90). The first tab 120 may have a bent tab configuration such that the first tab 120 extends radially inward and axially outward from the first axial end 126.

The at least one second tab 122 is disposed at a position axially between and spaced from the first axial end 126 and the second axial end 128. For example, the second tab 122 of FIGS. 4-6 is disposed within the notch 136 formed by the cylindrical body portion 118. The sleeve body 114 of FIGS. 4-6 includes a single second tab 122, however, the present disclosure is not limited to any particular number of the at least one second tab 122. The second tab 122 extends radially inward from the cylindrical body portion 118. The second tab 122 of FIGS. 4-6 is disposed at (e.g., on, adjacent, or proximate) the second axial end 92 and radially overlaps the first fitting body 86. Accordingly, the second tab 122 may prevent or otherwise limit relative axial movement between the mechanical dissuasion device 68 and the first fitting 80 and the second fitting 98. For example, the second tab 122 of FIGS. 4-6 may prevent or otherwise limit axial movement of the mechanical dissuasion device 68 in an axial direction from the second fitting 98 toward the first fitting 80 (e.g., as a result of physical contact between the second tab 122 and the first fitting body 86 at the second axial end 92). In other words, the at least one first tab 120 and the at least one second tab 122 may cooperatively maintain the mechanical dissuasion device 68 axially fixed or substantially axially fixed relative to the first fitting 80 and the second fitting 98. The second tab 122 may have a bent tab configuration such that the second tab 122 extends radially inward and axially outward from the position of the cylindrical body portion 118 from which the second tab 122 extends.

As previously discussed, the sleeve body 114 may include one or more fastener mount portions 124. The fastener mount portions 124 may accommodate, support, and/or retain one or more fasteners (e.g., the at least one fastener 116) used for positionally fixing the mechanical dissuasion device 68 relative to the first fitting 80 and the second fitting 98. For example, the fastener mount portions 124 of FIGS. 4-6 are configured as opposing fastener mount portions including a first fastener mount portion 124A and a second fastener mount portion 124B. The first fastener mount portion 124A is disposed at (e.g., on, adjacent, or proximate) the first circumferential end 130 and extends radially outward from the cylindrical body portion 118. The second fastener mount portion 124B is disposed at (e.g., on, adjacent, or proximate) the second circumferential end 132 and extends radially outward from the cylindrical body portion 118. The first fastener mount portion 124A and the second fastener mount portion 124B may be disposed axially between the at least one first tab 120 and the at least one second tab 122, for example, to axially align the first fastener mount portion 124A and the second fastener mount portion 124B with the first fitting body 86, thereby facilitating secure attachment of the mechanical dissuasion device 68 to the first fitting body 86. The first fastener mount portion 124A forms a first fastener aperture 138A. The second fastener mount portion 124B forms a second fastener aperture 138B. The first fastener aperture 138A and the second fastener aperture 138B may be aligned, for example, to receive the at least one fastener 116 (e.g., a bolt) therethrough. One of the first fastener aperture 138A or the second fastener aperture 138B may be a threaded fastener aperture respectively formed by the first fastener mount portion 124A or the second fastener mount portion 124, for example, to threadably engage the at least one fastener 116 having a threaded configuration with the first fastener mount portion 124A or the second fastener mount portion 124. The present disclosure, however, is not limited to a threaded configuration of the first fastener aperture 138A or the second fastener aperture 138B. Depending on the configuration of the at least one fastener 116, the sleeve body 114 may not include the fastener mount portions 124.

The at least one fastener 116 of FIGS. 4 and 5 includes a threaded fastener 140 and a nut 142. The threaded fastener 140 of FIGS. 4 and 5 extends through the first fastener aperture 138A and the second fastener aperture 138B. The nut 142 of FIGS. 4 and 5 is threadably engaged with the threaded fastener 140 to control a size (e.g., circumferential size) of the slot 134 and, thereby, securely attach the mechanical dissuasion device 68 to the first fitting 80 (e.g., by tightening the mechanical dissuasion device 68 about the first fitting 80). The present disclosure, however, is not limited to the particular at least one fastener 116 of FIGS. 4 and 5. For example, the threaded fastener 140 may be threadably engaged with one of the first fastener aperture 138A or the second fastener aperture 138B. Alternatively, the at least one fastener 116 may include any suitable fastener for securely attaching the mechanical dissuasion device 68 to another component (e.g., the first fitting 80) such as, but not limited to, a band tightener (e.g., a metal hose clamp) or the like.

The mechanical dissuasion device 68 of the present disclosure may be used in fluid assemblies to prevent and/or obstruct the operation of fluid assembly components forming a joint whereby the fluid assembly components are connected together in fluid communication. The mechanical dissuasion device 68 may deter and/or discourage a maintenance technician or other operator from inadvertently or improperly operating the fluid assembly components obstructed by the mechanical dissuasion device 68, or otherwise reduce the likelihood of undesired operation of the fluid assembly components. For example, the mechanical dissuasion device 68 may serve as a warning or other indication for maintenance technicians or other operators that the obstructed fluid assembly components should not be operated without verifying the technical and/or procedural requirements for operation. Where operation of the particular fluid assembly components is necessary, the mechanical dissuasion device may simply be removed from the associated joint prior to operation. The mechanical dissuasion device 68 of the present disclosure may have particular utility when used in combination with fluid assembly components and joints which have restrictive operational requirements, are sensitive to mechanical operation, and/or have a recognized history of improper operation.

Figure 7:
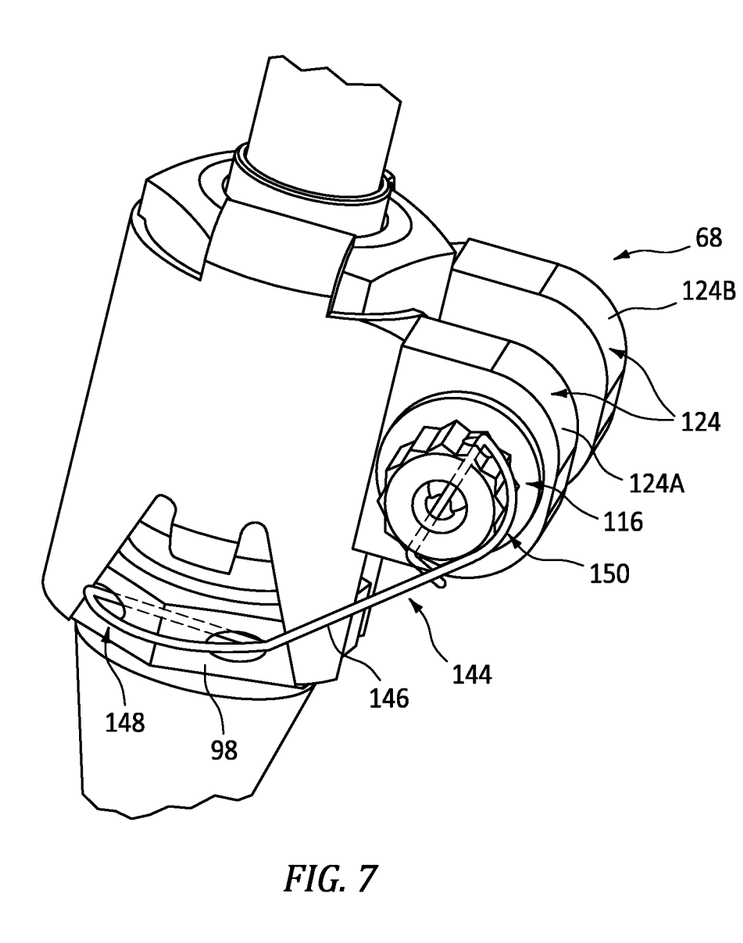
FIG. 7 illustrates another perspective view of a portion of the fluid assembly of FIG. 2 with the mechanical dissuasion device installed, in accordance with one or more embodiments of the present disclosure.

Referring to FIG. 7, the mechanical dissuasion device 68 may include a locking device 144. The locking device 144 may be configured to prevent or discourage operation (e.g., removal) of the mechanical dissuasion device 68. The locking device 144 may additionally or alternatively be configured to prevent or reduce the likelihood of foreign object damage (FOD) due to components of the mechanical dissuasion device 68. For example, the locking device 144 may prevent or reduce the likelihood of the at least one fastener 116 becoming detached from the one or more fastener mount portions 124 or other components of the mechanical dissuasion device 68 (e.g., as a result of gas turbine engine 20 vibration (see FIG. 2), fastener material failure, etc.). The locking device 144 may maintain the at least one fastener 116 in a fixed position. The locking device 144 of FIG. 7 includes a locking wire 146. The locking wire 146 extends between and to a first end 148 of the locking wire 146 and a second end 150 of the locking wire 146. The locking wire 146 may be fixedly attached to the at least one fastener 116 and to another component 62, 64, 68 of the fluid assembly 58 to prevent or reduce the likelihood of the at least one fastener 116 becoming detached from the one or more fastener mount portions 124 or other components of the mechanical dissuasion device 68. For example, the locking wire 146 of FIG. 7 is fixedly attached to the second fitting 98 (e.g., an aperture formed by the second fitting 98) at the first end 148 and to the at least one fastener 116 (e.g., an aperture formed by the at least one fastener 116 at the second end 150. The threaded fastener 116 of FIG. 7 may also be threadably engaged with the second fastener mount portion 124B, thereby minimizing components of the at least one fastener 116 (e.g., eliminating the nut 142 (see FIG. 5)) so as to minimize FOD risk presented by the at least one fastener 116. The present disclosure, however, is not limited to the particular locking device 144 of FIG. 7. For example, the locking device 144 may alternatively include a keyed lock, non-standard fitting operating surfaces (e.g., a non-hex fitting, an asymmetrical fitting, etc.), or other locking configurations to prevent or discourage operation (e.g., removal) of the mechanical dissuasion device 68.

Figure 8A:
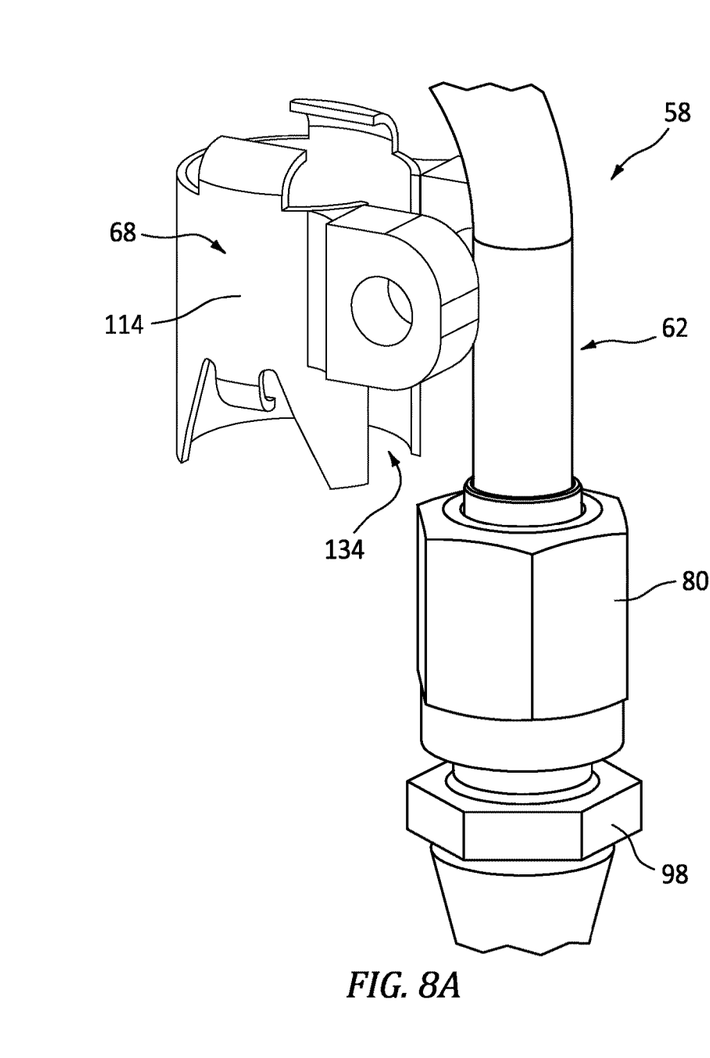
FIGS. 8A-D illustrate sequential perspective views of a portion of the fluid assembly of FIG. 2 for an installation process of the mechanical dissuasion device, in accordance with one or more embodiments of the present disclosure.
Figure 8B:
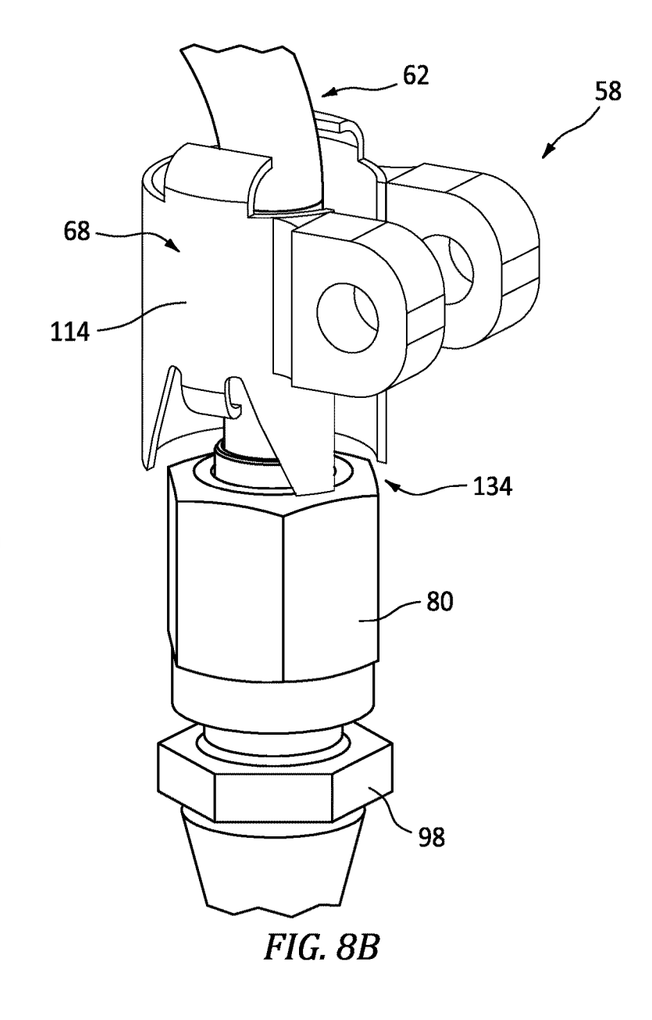
Figure 8C:
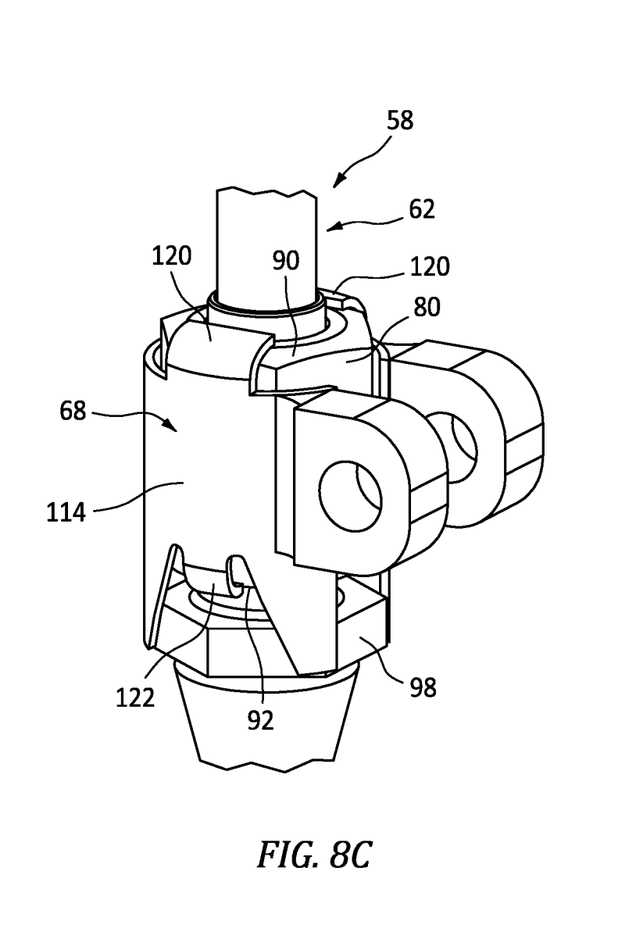
Figure 8D:
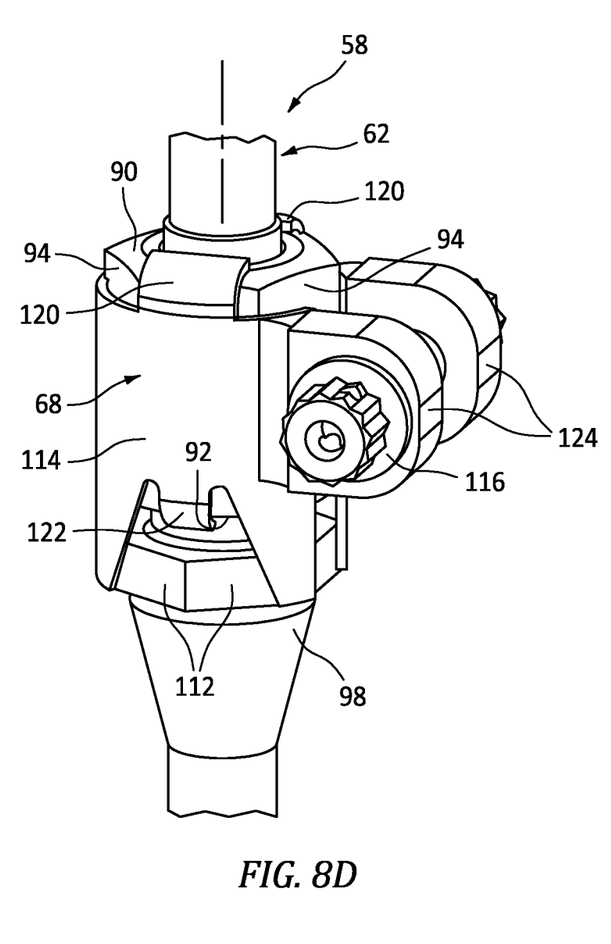

FIGS. 8A-D illustrate perspective views of a portion of the fluid assembly 58 for an installation sequence of the mechanical dissuasion device 68. As shown in FIGS. 8A and 8B, the mechanical dissuasion device 68 may be inserted onto the first fluid conduit 62 (e.g., through the slot 134. As shown in FIG. 8C, the sleeve body 114 may be positioned surrounding the first fitting 80. The sleeve body 114 may be positioned with the first tab 120 disposed at (e.g., on, adjacent, or proximate) the first axial end 90 and the second tab 122 disposed at (e.g., on, adjacent, or proximate) the second axial end 92. For example, the sleeve body 114 may be flexed to facilitate clearance between the tabs 120, 122 and the first fitting 80 and installation of the mechanical dissuasion device 68 onto the first fitting 80. As shown in FIG. 8D, the at least one fastener 116 may be installed (e.g., in the fastener mount portions 124) and adjusted (e.g., tightened) to securely attached the mechanical dissuasion device 68 onto the first fitting 80 to obstruct the mechanical operating surfaces (e.g., exterior surfaces 94, 112) of the first fitting 80 and the second fitting 98.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
    a first fluid conduit including a first conduit body and a first threaded fitting, the first conduit body including a first end, the first threaded fitting disposed at the first end, the first threaded fitting extending between and to a first axial fitting end and a second axial fitting end;
    a second fluid conduit including a second conduit body and a second threaded fitting, the second conduit body including a second end, the second threaded fitting disposed at the second end, the second threaded fitting threadably engaged with the first threaded fitting; and
    a mechanical dissuasion device including a sleeve body forming a cylindrical body portion, a first tab, and a second tab,
        the cylindrical body portion extending circumferentially about the first threaded fitting, the second threaded fitting, and a center axis of the sleeve body, the cylindrical body portion extending circumferentially between and to a first circumferential end and a second circumferential end, the first circumferential end circumferentially spaced from the second circumferential end, the cylindrical body portion extending axially between and to a first axial end and a second axial end,
        the first tab extending from the cylindrical body portion at the first axial end, the first tab disposed at the first axial fitting end, and
        the second tab extending from the cylindrical body portion at a position axially spaced from the first axial end and the second axial end, the second tab disposed at the second axial fitting end;
    wherein the first threaded fitting includes a first exterior mechanical operating surface and the cylindrical body portion is disposed circumferentially and axially coincident with the first exterior mechanical operating surface;
    wherein the cylindrical body portion forms a slot between the first circumferential end and the second circumferential end, the slot extending from the first axial end to the second axial end;
    wherein the sleeve body further forms opposing fastener mount portions including a first fastener mount portion and a second fastener mount portion, the first fastener mount portion disposed at the first circumferential end and extending radially outward from the cylindrical body portion, the first fastener mount portion forming a first fastener aperture, the second fastener mount portion disposed at the second circumferential end and extending radially outward from the cylindrical body portion, the second fastener mount portion forming a second fastener aperture;
    wherein the mechanical dissuasion device further includes a fastener extending through the first fastener aperture and the second fastener aperture, the fastener configured to control a size of the slot;
    wherein the mechanical dissuasion device further includes a locking device fixedly attached to the fastener, the locking device configured to maintain the fastener in a fixed position; and
    wherein the locking device includes a locking wire extending between and to a first wire end and a second wire end, the locking wire fixedly attached to the second threaded fitting at the first wire end and the locking wire fixedly attached to the fastener at the second wire end.

2. The assembly of claim 1, wherein the first fluid conduit and the second fluid conduit form a fluid seal therebetween.

3. The assembly of claim 1, wherein the first threaded fitting is rotatably mounted to the first conduit body.

4. The assembly of claim 1, wherein the second threaded fitting includes a second exterior mechanical operating surface, and the cylindrical body portion is disposed circumferentially and axially coincident with the second exterior mechanical operating surface.

5. The assembly of claim 1, wherein the first exterior mechanical operating surface forms a portion of a hexagonal pattern.

* * * * *